Feb. 18, 1947. W. JOHNDREW 2,416,055
MEANS FOR INTERRUPTING THE MOVEMENT OF A TOOL
Filed Nov. 13, 1943 2 Sheets-Sheet 1

INVENTOR
Wilbur Johndrew
BY
Beau, Brooks, Buckley & Beau.
ATTORNEYS

Feb. 18, 1947. W. JOHNDREW 2,416,055
MEANS FOR INTERRUPTING THE MOVEMENT OF A TOOL
Filed Nov. 13, 1943 2 Sheets-Sheet 2

INVENTOR
Wilbur Johndrew
BY
Beau, Brooks, Buckley & Beau.
ATTORNEYS

Patented Feb. 18, 1947

2,416,055

UNITED STATES PATENT OFFICE 2,416,055

MEANS FOR INTERRUPTING THE MOVEMENT OF A TOOL

Wilbur Johndrew, Buffalo, N. Y.

Application November 13, 1943, Serial No. 510,106

6 Claims. (Cl. 192—125)

My invention relates in general to means for interrupting the movement of a tool, and more particularly to such means which are actuated by contact with the workpiece being acted upon for the performance of useful work by the tool itself and/or to initiate the operation of some cooperating tool in sequential manner. While the invention is applicable to any form of machine where it is desired to move a tool toward and into contact with a workpiece and to stop the movement of the tool by such contact, I have shown and described the invention in connection with the bucking tool of a riveting machine.

This application is a division of my previously filed application Serial No. 452,606, upon automatic multiple riveters.

The principal object of my invention has been to provide means controlled by the contact of the tool with the workpiece which shall stop further movement of the tool.

Another object has been to provide a tripping plate carried at and forming at least a part of the working surface of the tool for stopping the movement of the tool upon contact with the surface of a workpiece, whereby an operator may move the tool toward the workpiece from any distance with the assurance that the movement of the tool will be stopped at a predetermined position in its travel.

The above objects and advantages have been accomplished by the device shown in the accompanying drawings, of which:

Figure 1:
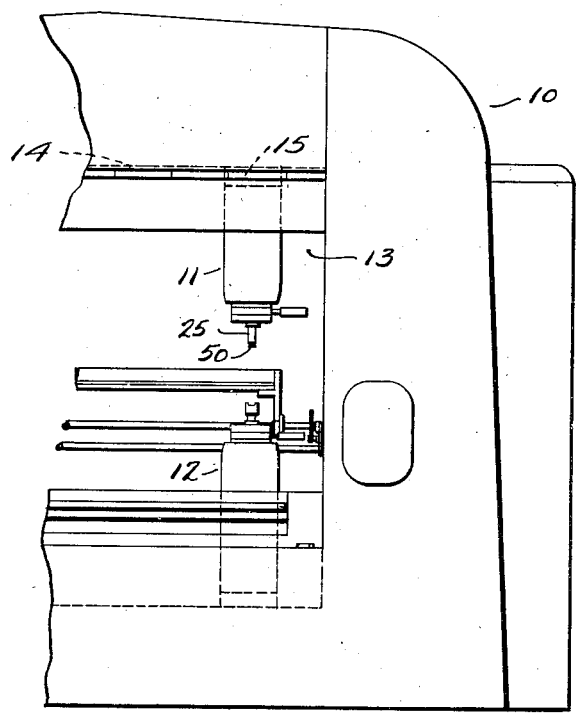
Fig. 1 is a fragmentary front view showing a riveting machine equipped with my invention.

When my invention is to be used in connection with a riveting machine 10 as shown in Fig. 1, it is preferably applied to the bucking unit 11 thereof. For illustrative purposes the riveting unit 12 of the riveting machine is also shown, although my invention does not contemplate or is it necessary to have a riveting or other co-acting tool in addition to the bucking unit which carries my invention. When used in connection with a riveting machine such as shown in Fig. 1, the bucking unit 11 is movable laterally across the opening 13 of the machine upon ways 14.

Engaging with the ways 14 is a base plate 15 which carries the bucking unit.

So as to make it convenient and easy to adjust the bucking unit, it is mounted upon supporting rollers 16 which are engageable with supporting rails 20 carried by the ways 14 and in spaced relation therewith. The rollers 16 are carried upon eccentric sleeves 21 which make it possible to adjust the roller so that there is only a slight clearance between the top bearing face of the base plate 15 and the ways 14. Obviously, this clearance space does not exist when the bucking unit is operating since pressure upon the unit will cause it to bear firmly against the ways 14. Guide rollers 22 are likewise carried by the base plate and engage with the inner surfaces of the ways 14, thereby guiding the unit across the ways.

The bucking unit comprises a cylinder 23 having a base flange 24 which is secured to the base plate 15 of the unit. The cylinder is provided with a longitudinal bore 27 in which is slidably mounted a bucking ram 25. This ram is reciprocated within the cylinder preferably by means of a ram screw 26. This screw is mounted within a longitudinal bore 30 formed in the ram, and passes through a nut 31, secured to the upper end of the ram. This screw is preferably mounted upon a drive shaft 32 which extends longitudinally through the screw. The shaft is secured to the screw in non-rotatable manner preferably by means of a diametrically arranged key 33 which engages a diametrical slot 34 formed in the screw 26 and also with a registering diametrical slot 35 formed in the lower end of the shaft 32. The upper end of the drive shaft is mounted in the base flange 24 of the unit in an anti-friction bearing 36. An operating motor 37 of the reversing type is mounted upon the base plate 15 and its shaft 40 is connected to the drive shaft 32 by any suitable means. So as to prevent the ram 25 from rotating within the cylinder 23, I provide a key 41 carried preferably by the cylinder and engageable with a keyway 42 formed in the ram.

The bucking tool or anvil 43 of the riveting machine is carried at the lower end of the ram 25 and is preferably secured to an index plate 44. This index plate is secured in rotatable manner to the bottom surface of the ram preferably by means of an index flange 45, suitable detent means 46 being employed to hold the index plate in its adjusted position.

Figure 2:
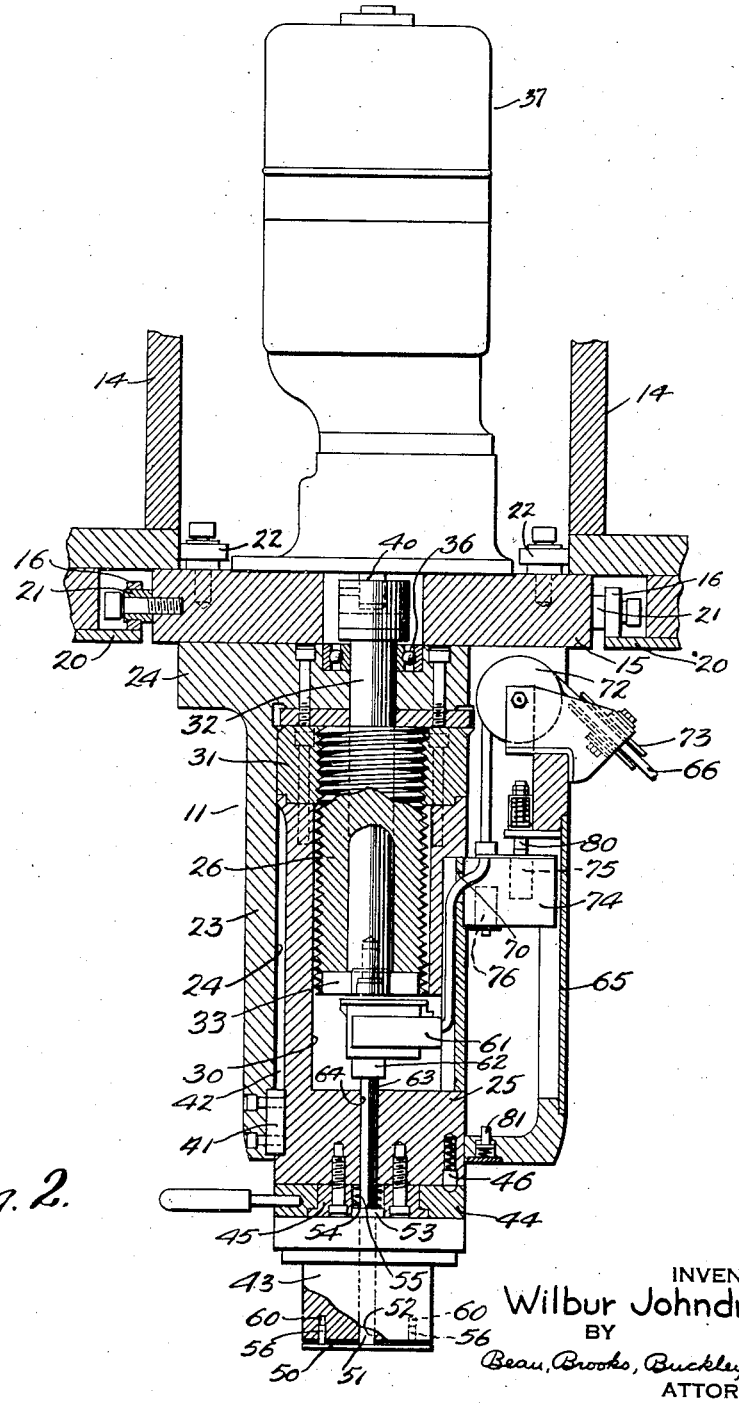
Fig. 2 is a longitudinal section view of the bucking tool of the riveting machine.

As shown in Fig. 2, my invention comprises a tripping plate 50 arranged in spaced relation with the bottom abutment face of the bucking tool and forming the work surface of such tool. This plate is mounted upon a plate rod 51 which extends through an aperture 52 formed in the bucking tool. A flange 53 is preferably carried at the upper end of the rod 51 to prevent the rod and plate from becoming displaced. The flange 53 is mounted in an enlarged recess 54 and a helical spring 55 is mounted within this recess, having one end bearing against the flange 53 and the other end preferably against the bottom surface of the ram 25, whereby the tripping plate will be maintained normally in the position shown in Fig. 2. In order to keep the tripping plate in alignment with the bucking tool or anvil, I may use one or more pins 56 which are carried by the tripping plate and engaged with registering apertures 60 formed in the bucking tool or anvil.

The bore 30 in the ram 25 is preferably considerably longer than the screw 26, and in the space thereby provided I mount a control switch 61. This switch is secured to the bucking ram for movement therewith and the button 62 thereof is in contact with a switch rod 63. This rod is slidably mounted within aperture 64 formed centrally through the bottom portion of the ram and has its lower end contacting the flange 53 of the plate rod 51, whereby movement of the plate rod through movement of the plate will be conducted to the button 62 of the switch.

Arranged along the side of the ram cylinder is a ram housing 65, and the electric conduit 66 extending from the switch 61 passes through an aperture 70 formed in the wall of the ram and upwardly within the housing to the sheaves 72 and 73 over which it passes to the associated electric controls.

Also mounted within the housing 65 is a switch block 74 which is secured to the ram and which carries safety switches 75 and 76. The switch 75 engages a spring pressed stop pin 80 carried by the housing to limit the upward movement of the ram, and the switch 76 engages a spring pressed stop pin 81 carried by the housing and serves to interrupt the current to the motor 37 to stop the ram at the limit of its stroke in the event that the control switch 61 or other suitable means for controlling the movement of the ram fail to function.

Figures 3, 4:
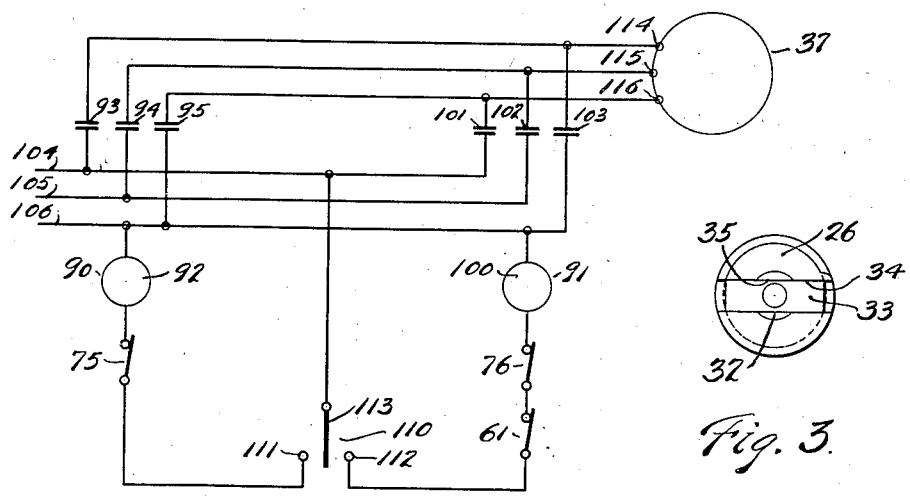
Fig. 3 is a bottom view of the bucking ram feed screw showing its means of attachment to the drive shaft thereof.
Fig. 4 is a diagrammatic view of one form of electric control circuit used in connection with my invention.

As will be obvious from the foregoing, as the ram 25 is moved downwardly, it will carry the tripping plate 50 toward the workpiece, and upon contact with such workpiece the tripping plate will be pushed upwardly toward the abutment surface of the bucking tool or anvil 43. Such movement will cause the upward movement of the plate rod 51 and switch rod 63, causing the button 62 of the control switch 61 to be depressed. This control switch may be either a normally closed switch or a normally open switch, depending upon the kind of circuit with which it is used. In Fig. 4, I have shown an illustrative circuit in which my invention may be used, and have shown a normally closed control switch. In this circuit two magnetically held contactors 90 and 91 are employed, the contactor 90 controlling the upward movement of the bucking ram, and the contactor 91 controlling the downward movement. The contactor 90 is provided with a holding or operating coil 92 and normally open contacts 93, 94 and 95. In like manner the contactor 91 is provided with a holding or operating coil 100 and normally open contacts 101, 102, and 103. The power lines are indicated at 104, 105 and 106 which receive their electrical energy from a suitable source of supply. One side of each of the holding coils 92 and 100 is preferably connected to the power line 105, current returning to the power line 104 through a double throw hand operated switch 110. This hand switch has a contact 111 which is connected to coil 92 of contactor 90 and a contact 112 which is connected to coil 100 of contactor 91. A switch arm 113 serves to connect either contact 111 or contactor 112 with the power line 104. The control switch 61 is preferably connected in series with the coil 100, and the safety switch 76 is also connected in series with the coil and with the control switch 61. The safety switch 75 is connected in series with the coil 92. Contacts 93, 94 and 95 are connected respectively to the motor terminals 114, 115 and 116. In like manner contacts 101, 102 and 103 of contactor 91 are connected respectively to terminals 116, 115 and 114 of the motor.

From the foregoing, it will be clear that when the switch arm 113 of switch 110 is moved to close the circuit through 112 thereof current will flow from lead 104 through switch 61, switch 76, and holding coil 100 of contactor 91 back to power line 105, thereby energizing this operating or holding coil. This will serve to close the normally open contacts 101, 102 and 103 of this contactor and supply current to motor 37 to cause it to move the ram downwardly. When the bucking ram has reached the point in its travel where the tripping plate 50 contacts the workpiece, the control switch 61 will be opened thereby interrupting the flow of current through the holding or operating coil 100 and allowing contacts 101, 102, and 103 to fall to their normal open positions, thereby interrupting current to the motor and stopping further downward travel of the bucking ram. Obviously, should, for any reason, the control switch 61 fail to open, further downward movement of the ram would cause safety switch 76 to be opened by contact with the spring pressed pin 81, thereby breaking the circuit through the holding coil 100. When it is desired to move the ram upwardly, the arm 113 of the switch 110 is moved so as to close the circuit through the contact 111 thereof. Current will now flow from the power line 104 through safety switch 75 and holding or operating coil 92 of the contactor 90. Energization of this coil will cause the closing of the normally open contacts 93, 94 and 95 of the contactor, thereby allowing current to flow from these contacts respectively to the terminals 114, 115 and 116 of the motor, whereby the motor is operated in the reverse direction to elevate the ram. When the ram has reached the upper end of its predetermined travel, the safety switch 75 will contact the spring pressed stop pin 80 thereby opening this switch and interrupting the flow of current through the holding coil 92, thereby allowing the contacts 93, 94 and 95 to fall to their normally open positions. Current is thus interrupted to the motor and the upward travel of the ram is stopped.

Having described my invention, what I claim is:

1. Means for interrupting the movement of a tool, comprising a reciprocating member, power actuated means for reciprocating said member, a tool carried by said member and having an abutment surface movable toward a workpiece, said tool having an axially movable work-engaging part, said part being interposed between said surface and the workpiece and forming the work-engaging face of said tool, whereby said part will be moved relatively to said surface by and during contact thereof with the workpiece, and means controlled by such relative movement to arrest said reciprocating member at a predetermined place in the working stroke of the tool.

2. Means for interrupting the movement of a tool, comprising a reciprocating member, screw means for reciprocating said member, an electric motor for actuating said screw means, a tool carried by said member and having an abutment surface movable toward a workpiece, said tool having an axially movable work-engaging part, said part being interposed between said surface and the workpiece and forming the work-engaging face of said tool, whereby said part will be moved relatively to said surface by and during contact thereof with the workpiece, switch means carried by and movable with said member for controlling the operation of said motor, and means connecting said tool part with said switch means and operable by and during the relative movement of said tool and said part to interrupt said motor.

3. Means for interrupting the movement of a tool, comprising a reciprocating member, screw means for reciprocating said member, an electric motor for actuating said screw means, a tool carried by said member and having an abutment surface movable toward a workpiece, said tool having an axially movable work-engaging part, said part being interposed between said surface and the workpiece and forming the work-engaging face of said tool, whereby said part will be moved relatively to said surface by and during contact thereof with the workpiece, switch means carried by and movable with said member, a spring pressed switch rod slidably mounted in said member and operably connecting said switch with said tool part, whereby said switch will be operated by and during the relative axial movement between said tool and said part to interrupt the movement of said member at a predetermined place in the working stroke of the tool.

4. Means for interrupting the movement of a tool, comprising a reciprocating member, screw means for reciprocating said member, an electric motor for actuating said screw means, a tool carried by said member and having an abutment surface movable toward a workpiece, said tool having an axially movable work-engaging part, said part being interposed between said surface and the workpiece and forming the work-engaging face of said tool, whereby said part will be moved relatively to said surface by and during contact thereof with the workpiece, a control switch carried by said member, an auxiliary safety switch carried by and movable with said member, said control switch and said safety switch being connected in series with each other and with said motor, means connecting said control switch with said tool to operate the same by and during the relative axial movement between said tool and said part, and stop means engageable with said safety switch to interrupt the current through said motor.

5. Means for interrupting the movement of a tool, comprising a reciprocating member, power actuated means for reciprocating said member, a tool carried by said member and having an abutment surface movable toward the workpiece, said tool having an axially movable work-engaging part substantially coextensive with said surface, said part being interposed between said surface and the workpiece and forming the work-engaging face of the tool, whereby said part will be moved relatively to said surface by and during contact thereof with the workpiece, and means controlled by said relative movement to arrest said reciprocating means at a predetermined place in the working stroke of the tool.

6. Means for interrupting the movement of a tool, comprising a reciprocating member, power actuated means for reciprocating said member, a tool carried by said member and having an abutment surface movable toward the workpiece, a tripping plate carried by said tool and arranged adjacent the abutment surface thereof, said plate being interposed between said surface and the workpiece and movable relatively to said surface, and means for normally keeping said plate in spaced relation with said surface, whereby upon contact with the workpiece, the plate will move toward said surface and cause the movement of said reciprocating means to be arrested at a predetermined place in the working stroke of the tool.

WILBUR JOHNDREW.

REFERENCES CITED

The following references are of record in the file of this patent:

UNITED STATES PATENTS

| Number | Name | Date |
| --- | --- | --- |
| 2,143,716 | Scaife | Jan. 10, 1939 |
| 2,339,597 | Barnes | Jan. 18, 1944 |
| 2,297,596 | Westin | Sept. 29, 1942 |
| 2,328,919 | Merriman | Sept. 7, 1943 |
| 2,134,933 | Smith | Nov. 1, 1938 |
| 816,541 | Douglas | Mar. 27, 1906 |
| 979,617 | Weatherson | Dec. 27, 1910 |
| 2,148,704 | Merritt | Feb. 28, 1939 |
| 2,365,147 | Speller | Dec. 12, 1944 |
| 376,541 | Mergenthaler | Jan. 17, 1888 |